United States Patent [19]

Morioka et al.

[11] Patent Number: 4,546,291
[45] Date of Patent: Oct. 8, 1985

[54] FOCUS CIRCUIT FOR MULTI-TUBE IMAGE PICK-UP APPARATUS

[75] Inventors: Yoshihiro Morioka; Hiroyuki Sugimoto, both of Atsugi, Japan

[73] Assignee: Sony Corporation, Tokyo, Japan

[21] Appl. No.: 354,724

[22] Filed: Mar. 4, 1982

[30] Foreign Application Priority Data

Mar. 5, 1981 [JP] Japan .................................. 56-31760

[51] Int. Cl.$^4$ ............................................. H01J 29/58
[52] U.S. Cl. ................................................. 315/382
[58] Field of Search ..................... 315/382, 382.1, 387, 315/371; 313/442

[56] References Cited

U.S. PATENT DOCUMENTS 4,223,253 9/1980 Bendell .............................. 315/382

Primary Examiner—Theodore M. Blum
Assistant Examiner—Gregory C. Issing
Attorney, Agent, or Firm—Lewis H. Eslinger; Alvin Sinderbrand

[57] ABSTRACT

In a multi-tube image pick-up apparatus, such as, a color television camera, having image pick-up tubes of the electro-magnetic focusing type with their respective focusing coils connected in series with each other for minimizing the power consumption thereof; a main focus current control circuit is connected in series with the series-connected focusing coils for controlling a main focus current so as to maintain an adjustably predetermined value thereof, and individual focus current control circuits respectively corresponding to the image pick-up tubes are connected in parallel with the respective focusing coils for controlling the individual focus current flowing through each of the focusing coils without influencing the individual focus currents through the other coils.

11 Claims, 2 Drawing Figures

FOCUS CIRCUIT FOR MULTI-TUBE IMAGE PICK-UP APPARATUS

BACKGROUND OF THE INVENTION

1. Field of the Invention

This invention relates generally to a focus circuit for a multi-tube image pick-up apparatus, such as, a color television camera, and more particularly is directed to an improved focus current control circuit for such apparatus having a plurality of image pick-up tubes of the electro-magnetic focusing type.

2. Description of the Prior Art

The electron beam focusing arrangements for image pick-up tubes are generally either of the electro-magnetic focusing type or the electro-static focusing type. Further, extensive use has been made of image pick-up tubes of the electro-magnetic focusing type in which an electro-magnetic field is generated for focusing the electron beam by causing a current flow through a respective focusing coil.

In multi-tube image pick-up apparatus, such as, a three-tube color television camera provided with a first image pick-up tube for providing a signal corresponding to a red image, a second image pick-up tube for providing a signal corresponding to a green image and a third image pick-up tube for providing a signal corresponding to a blue image, and also in which each of the image pick-up tubes is of the electro-magnetic focusing type, the focusing coils associated with the three image pick-up tubes, respectively, are connected either in series or in parallel with each other. When the focusing coils are connected in series, power consumption for focusing the electron beams of the three image pick-up tubes is minimized. However, when the focusing coils are connected in series, as aforesaid, current drift in one of the focusing coils has a direct influence upon the other focusing coils so that it is difficult to maintain the optimum focusing conditions for the several image pick-up tubes. On the other hand, when the focusing coils of the three image pick-up tubes, respectively, are connected in parallel, the influence of current drift in one of the focusing coils upon the other focusing coils is minimized, but the current required is three times that needed for the series-connected focusing coils, so that power consumption of a multi-tube image pick-up apparatus with parallel-connected focusing coils is very substantially increased over that for the apparatus with series-connected focusing coils.

OBJECTS AND SUMMARY OF THE INVENTION

Accordingly, it is an object of this invention to provide a focus circuit for multi-tube image pick-up apparatus which avoids the above-described disadvantages of the prior art.

More particularly, it is an object of this invention to provide a focus circuit for a multi-tube image pick-up apparatus having image pick-up tubes of the electro-magnetic focusing type provided with their respective focusing coils connected in series with each other for minimizing the power consumption, and in which the focus circuit is arranged so that current drift in one of the focusing coils will not adversely influence currents flowing in the other focusing coils so as to detract from the optimum focusing conditions for the image pick-up tubes.

Another object of the invention is to provide a focus circuit for a multi-tube image pick-up apparatus, as aforesaid, which is of relatively simple and inexpensive circuit arrangement.

In accordance with an aspect of this invention, a focus current control circuit for a multi-tube image pick-up apparatus having a plurality of electro-magnetic focusing type image pick-up tubes including respective focusing coils connected in series with each other, comprises main focus current control means connected in series with the series-connected focusing coils for controlling a main focus current so as to maintain a predetermined value thereof, and a plurality of individual focus current control means respectively corresponding to the plurality of image pick-up tubes and each being connected in parallel with the respective one of the focusing coils for controlling an individual focus current flowing through such focusing coil.

In a preferred embodiment of the invention, each of the above mentioned individual focus current control means includes a constant current circuit which bypasses a portion of the main focus current away from the respective focusing coil and which includes a current control device, such as a transistor, in series with a current detecting or sensing resistor and a comparator for sensing the amount of the by-passed current and providing a corresponding output which is fed back to the respective current control device for stabilizing the by-passed current.

The above, and other objects, features and advantages of this invention, will be apparent in the following detailed description of an illustrative embodiment of the invention when read in conjunction with the accompanying drawings in which the same reference numerals are employed to identify corresponding parts in the several views.

DETAILED DESCRIPTION OF A PREFERRED EMBODIMENT

Figure 1:
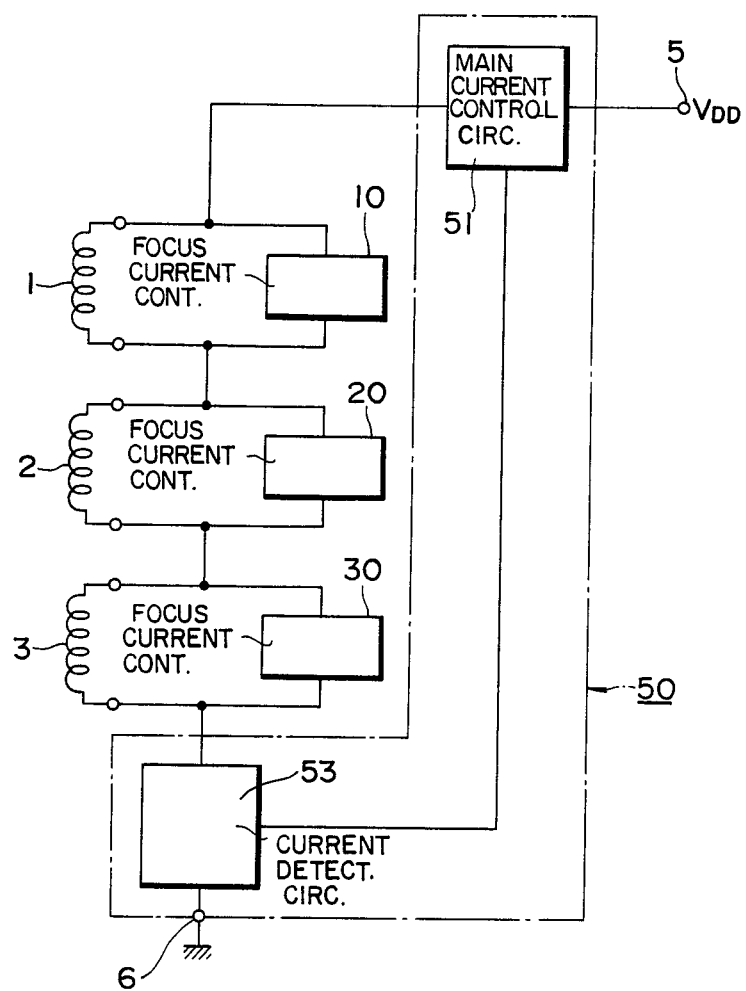
FIG. 1 is a block diagram showing the basic components of a focus current control circuit according to an embodiment of this invention.

Referring to the drawings in detail, and initially to FIG. 1 thereof, it will be seen that a multi-tube image pick-up apparatus, such as, a color television camera of the type having three image pick-up tubes for providing signals corresponding to red, green and blue images, respectively, includes focusing coils 1, 2 and 3 for focusing scanning electron beams in the respective pick-up tubes. More particularly, focusing coil 1 is operative to electro-magnetically focus a scanning electron beam in the so-called red image pick-up tube in response to the flow of a focus current through coil 1, focusing coil 2 is operative to electro-magnetically focus a scanning electron beam in the green image pick-up tube in response to the flow of a focus current in coil 2, and focusing coil 3 is operative to electro-magnetically focus a scanning electron beam in a blue image pick-up tube in response to the flow of a focus current in coil 3. In the focus circuit embodying the present invention, focusing coils 1, 2 and 3 are shown to be connected in series with each other and also with a main current control circuit 50 between a power source input terminal 5 and a ground terminal 6.

Main current control circuit 50 is shown to include a main current control section 51 connected between power source input terminal 5 and the first of the serially-connected focusing coils 1, 2 and 3 for controlling the main current flowing between terminals 5 and 6, and a current detecting section 53 connected between the last of the serially-connected focusing coils 1, 2 and 3 and ground terminal 6. As indicated schematically on FIG. 1, the main current flowing between power source input terminal 5 and ground terminal 6 is detected by main current detecting section 53 which provides a corresponding output fed back to main current control section 51 for maintaining the main current at a constant value.

Further, in accordance with this invention, individual focus current control circuits 10, 20 and 30 are connected in parallel with focusing coils 1, 2 and 3, respectively. Generally, in accordance with this invention, each of the individual focus current control circuits 10, 20 and 30 includes a current control section in series with a current detecting section, with the series-connected current control section and current detecting section being connected in parallel with the respective focusing coil 1, 2 or 3 for providing parallel-type current control in respect to the current through the respective focusing coil. In other words, each of the individual focus current control circuits 10, 20 and 30 by-passes a portion of the main focus current away from the respective focusing coil so that the current flowing through the latter is controlled by controlling the by-passed current flowing through the respective circuit 10, 20 or 30. Furthermore, as will appear hereinafter in detail, each of the individual focus current control circuits 10, 20 and 30 acts as a constant current source and performs a constant current operation by which the sum of the current through each of the focusing coils 1, 2 and 3 and of the by-passed parallel current through the respective individual focus current control circuit 10, 20 or 30 is made to be equal to the constantly maintained value of the main current.

Figure 2:
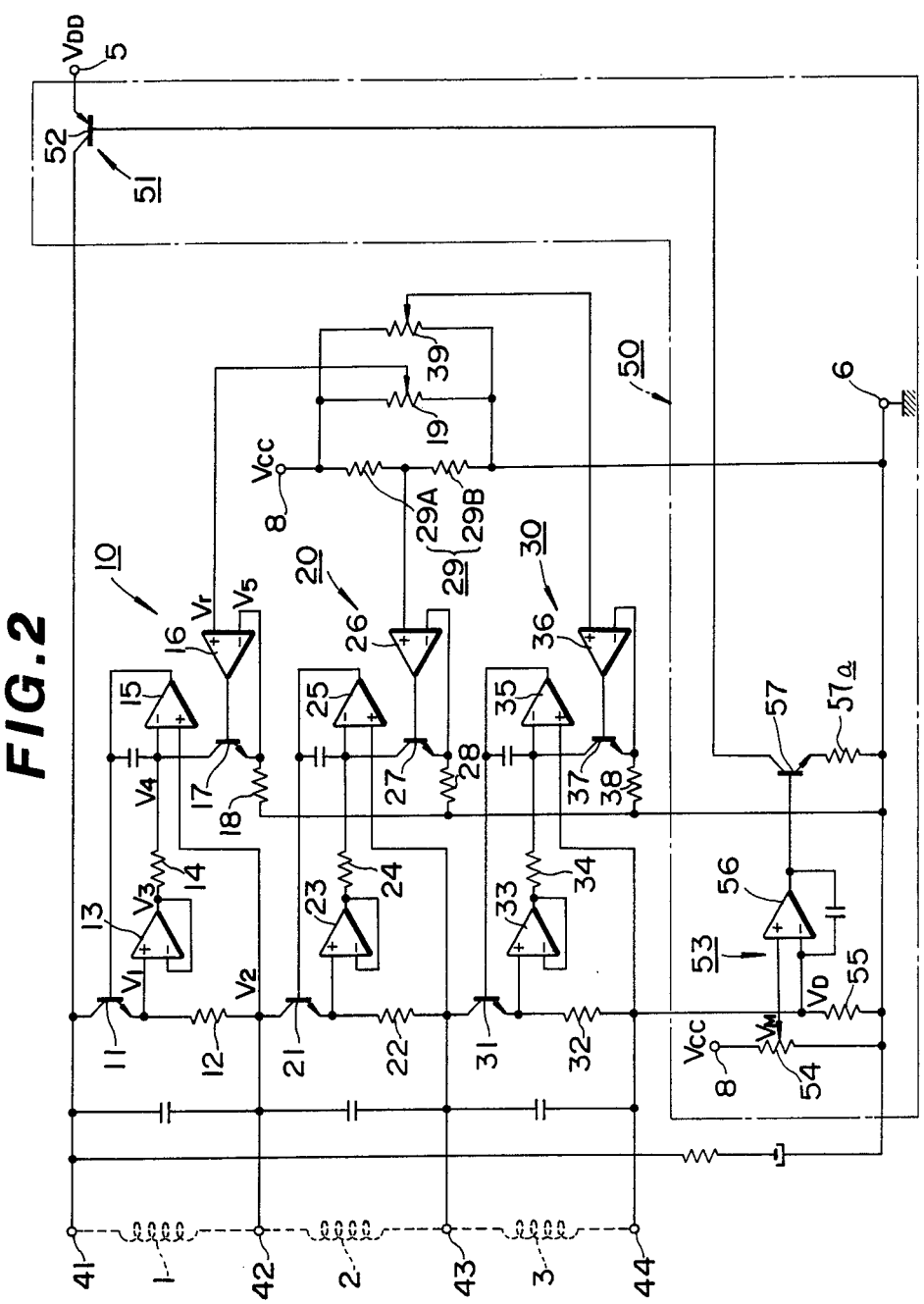
FIG. 2 is a circuit diagram showing details of circuit arrangements that may be employed to constitute the several components of the embodiment illustrated in FIG. 1.

Referring now to FIG. 2, it will be seen that, in the specific circuit arrangement of the components of the circuit according to the present invention generally described above with reference to FIG. 1, focusing coil 1 of the red image pick-up tube is shown in broken lines connected between first and second terminals 41 and 42, focusing coil 2 of the green image pick-up tube is shown in broken lines connected between second terminal 42 and a third connection terminal 43, and focusing coil 3 for the blue image pick-up tube is shown in broken lines connected between third connection terminal 43 and a fourth connection terminal 44. The current control section 51 of main current control circuit 50 is shown to be constituted by a PNP transistor 52 having its emitter connected to power source input terminal 5 and its collector connected to first connection terminal 41. For controlling the main current through transistor 52, main current detecting section 53 is shown to include a variable resistor 54 connected between a bias source input terminal 8 and ground terminal 6 and having a movable tap connected with a positive input of an operational amplifier 56 which has its negative input connected to fourth connection terminal 44 and also connected through a main current detection resistor 55 to ground terminal 6. The output of operational amplifier 56 is connected to the base of an NPN transistor 57, and the base of PNP transistor 52 is connected through the collector-emitter path of transistor 57 and a resistor 57a to ground terminal 6. The tap of variable resistor 54 is adjusted so that the resulting preset voltage $V_M$ obtained through resistive division of source voltage $V_{CC}$ at terminal 8, and which is applied to the positive input of amplifier 56 will correspond to a desired value of the main current. Operational amplifier 56 acts as a level comparator to compare the level of preset voltage $V_M$ with the level of a detected voltage $V_D$ corresponding to the main current detected by resistor 55, and the resulting comparison output obtained from operational amplifier 56 controls NPN transistor 57 which, in turn, controls the operation of PNP transistor 52 in current control section 51. It will be appreciated that the foregoing main current control circuit 50 is effective to maintain the main current at an adjustably predetermined constant current value corresponding to the voltage $V_M$ set by variable resistor 54.

The individual focus current control circuits 10, 20 and 30 connected in parallel with focusing coils 1, 2 and 3, respectively, are similar to each other. More particularly, in the embodiment specifically shown on FIG. 2, the first individual focus current control circuit 10 includes an NPN transistor 11 having its collector connected to first connection terminal 41 and its emitter connected to a positive input of an operational amplifier 13. The emitter of transistor 11 is further connected through a current detecting or sensing resistor 12 to second connection terminal 42. Operational amplifier 13 has its output connected to its negative input so that operational amplifier 13 acts as a mere buffer, or unity gain amplifier. Therefore, amplifier 13 provides, at its output, a voltage $V_3$ equal to the voltage $V_1$ applied to its positive input and which is proportional to the value of the current detected or sensed by current sensing resistor 12. The output of operational amplifier 13 is connected through a resistor 14 to a negative input of another operational amplifier 15 which has its positive input connected to second connection terminal 42. Operational amplifier 15 has its output connected to the base of transistor 11 so as to effect constant current control of the current flowing through transistor 11. Still another operational amplifier 16 has its output connected to the base of another NPN transistor 17 which has its collector connected to the negative input of operational amplifier 15 while the emitter of transistor 17 is connected to the negative input of third operational amplifier 16 and also through a resistor 18 to ground terminal 6. Operational amplifier 16 has its positive input connected to a movable tap of a variable resistor 19 for effecting adjustment of the red image pick-up tube focus. More particularly, adjustment of the movable tap of variable resistor 19 changes the value of a red focus adjustment voltage $V_r$ applied therefrom to the positive input of operational amplifier 16 which, through its control of transistor 17, correspondingly changes the value of the constant current flowing through resistor 18.

The second individual focus current control circuit 20 is connected between second and third connection terminals 42 and 43 and, as noted above, is similar to individual focus current control circuit 10. Thus, circuit 20 is shown to include a transistor 21, resistor 22, operational amplifier 23, resistor 24, operational amplifiers 25 and 26, transistor 27 and resistor 28 corresponding to, and connected to each other in the same manner as the elements of circuit 10 which have been described above as being identified by reference numerals 11–18, respectively. In the case of the second individual focus current control circuit 20, resistive means 29 for determining the green image pick-up tube focus adjustment, and hence which corresponds to the variable resistor 19 of circuit 10, is instead constituted by two fixed resistors 29A and 29B connected in series with each other.

The third individual focus current control circuit 30 is connected between third and fourth connection terminals 42 and 43 and, as earlier noted, is also similar to circuit 10. Thus, individual focus current control circuit 30 is shown to include a transistor 31, resistor 32, operational amplifier 33, resistor 34, operational amplifiers 35 and 36, transistor 37, resistor 38 and variable resistor 39 corresponding to, and connected to each other in the same manner as the elements of circuit 10 which have been described above as being identified by reference numerals 11–19, respectively.

Finally, it will be seen that variable resistor 19 for the red image pick-up tube focus adjustment, series connected resistor 29A and 29B for determining the green image pick-up tube focus, and variable resistor 39 for the blue image pick-up tube focus adjustment are connected in parallel between power source input terminal 8 and ground terminal 6.

The above described focus current control circuit according to the illustrated embodiment of this invention operates as follows:

Since the parallel circuits consisting of focusing coil 1 and focus current control circuit 10, focusing coil 2 and focus current control circuit 20, and focusing coil 3 and focus current control circuit 30, respectively, are connected in series between first and fourth connection terminals 41 and 44, the sum of the currents flowing through focusing coil 1 and transistor 11, the sum of the currents flowing through focusing coil 2 and transistor 21 and the sum of the currents flowing through focusing coil 3 and transistor 31 are all equal to each other and also equal to the main current. Since the main current is maintained constant at an adjustably determined value by main current control circuit 50, master focus adjustment can be effected by simultaneously controlling the currents through focusing coils 1, 2 and 3 through control of the main current provided that the currents through transistors 11, 21 and 31 of the respective individual focused current control circuits 10, 20 and 30 are maintained constant. As earlier noted, the adjustments of the main current, that is, the master focus adjustment, is effected by adjusting variable resistor 54 and thereby varying the voltage $V_M$ which is the reference voltage employed in operational amplifier 56 for comparison with the voltage $V_D$ indicative of the main current.

In the first individual focus current control circuit 10, operational amplifier 16, by controlling transistor 17 so as to make the voltage $V_5$ supplied to the negative input of amplifier 16 from the emitter of transistor 27 equal to the red focus adjustment voltage $V_r$ supplied to the positive input from variable resistor 19, is effective to hold the current through resistor 18 constant with little drift at a value corresponding to adjustment voltage $V_r$. Thus, the difference between output voltage $V_3$ of operational amplifier 13 and the voltage $V_4$ at the negative input of operational amplifier 15, that is, the voltage drop across resistor 14, is always constant. Therefore, the output of operational amplifier 15 can control the operation of transistor 11 so as to cause the voltages $V_4$ and $V_2$ applied to the negative and positive inputs, respectively, of operational amplifier 15 to become equal to each other. Since operational amplifier 13 acts merely as a buffer amplifier, the voltages $V_1$ and $V_3$ at its positive input and output, respectively, are equal to each other, and the voltage drop $(V_1-V_2)$ across current detecting or sensing resistor 12 is equal to the voltage drop $(V_3-V_4)$ across resistor 14. Since the voltage drop $(V_3-V_4)$ across resistor 14 is constant, as mentioned earlier, the voltage drop $(V_1-V_2)$ across resistor 12 is also constant, from which it follows that a constant current, corresponding to the adjustment voltage $V_r$ set by variable resistor 19 for the red focus adjustment, flows through transistor 11. Further, since the sum of the current flowing through focusing coil 1 and the current flowing through transistor 11 is constant, the previously described adjustment of the constant current through transistor 11 by adjustment of variable resistor 19 is effective to vary the constant current through focusing coil 1 and thereby to achieve red focus adjustment. It will be appreciated that such red focus adjustment can be effected independently of the currents through the other focusing coils 2 and 3 which are not varied in response to variation of the current through focusing coil 1.

Similarly, blue focus adjustment can be effected by varying the current flowing through focusing coil 3 by means of adjustment of variable resistor 39 and corresponding adjustment of the constant current through transistor 31 of the individual focus current control circuit 30.

If the green focus adjustment is considered as the reference for the previously mentioned red and blue focus adjustments, the green focus adjustment need not be independently varied. Thus, as in the circuit shown on FIG. 2, the resistive means 29 of the individual focus current control circuit 20 associated with focusing coil 2 of the green image pick-up tube may be constituted by the fixed resistors 29A and 29B to provide a constant current through transistor 21 which is varied only in response to the master focus adjustment by main current control circuit 50.

It will be appreciated from the above that, in a focus current control circuit according to this invention for a multi-tube image pick-up apparatus, such as, a three-tube color television camera having image pick-up tubes of the electro-magnetic focusing type, and in which the respective focusing coils 1, 2 and 3 are connected in series with each other and also with the main current control circuit 50 between power source input terminal 5 and ground terminal 6 it is possible to effect focus control of such three-tube type color television camera with one-third of the current that would be necessary if the focusing coils were connected in parallel. Further, the so-called master focus adjustment, that is, simultaneous control of the focusing of the several image pick-up tubes, can be simply effected through adjustment of the controlled main current by the main current control circuit 50. Moreover, since the currents flowing through the individual focusing coils 1, 2 and 3 are controlled independently by the respective focus current control circuits 10, 20 and 30 connected in parallel therewith, the current through one of the focusing coils can be varied without affecting the currents through the other focusing coils, whereby to permit the simple setting and variation of the focusing conditions for the several coils 1, 2 and 3. Moreover, current drift in one of the focusing coils cannot have an adverse effect upon the currents flowing through the other focusing coils so that the optimum focusing condition can be readily maintained for all of the pick-up tubes.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A focus current control circuit for a multi-tube image pick-up apparatus having a plurality of electromagnetic focusing type image pick-up tubes including respective focusing coils connected in series with each other, comprising: main focus current control means connected in series with said series-connected focusing coils for controlling a main focus current so as to maintain a predetermined value thereof, and a plurality of individual focus current control means respectively corresponding to said plurality of image pick-up tubes and each being connected in parallel with the respective one of said focusing coils for controlling an individual focus current flowing through said respective focusing coil, each of said individual focus current means including a constant current circuit which bypasses a portion of said main focus current away from said respective focusing coil.

2. A focus current control circuit as in claim 1; wherein said constant current circuit of each said individual focus current control means includes a current control device and a current sensing resistor in series therewith, and comparator means for sensing an amount of said by-passed current and providing a corresponding output which is fed back to said current control device for stabilizing said by-passed current.

3. A focus current control circuit as in claim 2; wherein at least one of said individual focus current control means further includes adjusting means for adjusting said amount of said by-passed current by changing a bias potential applied to said comparator means.

4. A focus current control circuit as in claim 3; wherein, in each of said individual focus current control means, said comparator means has first and second input terminals, and said adjusting means includes a second current control device connected to one of said input terminals of the respective comparator means, a second resistor through which a junction point of the respective series connected first-mentioned current control device and current sensing resistor is connected to said one input of the comparator means, and means for applying a potential to said second current control device for adjusting a current flowing therethrough and thereby determining the amount of the respective individual focus current.

5. A focus current control circuit as in claim 4; wherein, in each of said individual focus current control means, said first current control device is a first transistor having a collector-emitter path in series with the respective current sensing resistor and a base electrode receiving an output of said comparator means to correspondingly control the current flow in said path, buffer means connects said junction point with said second resistor, and the other of said input terminals of the comparator means is connected with the end of the first-mentioned current sensing resistor remote from said junction point.

6. A focus current control circuit as in claim 5; wherein said second current control device is a second transistor having a collector-emitter path connected between said one input terminal of the comparator means and a reference voltage and a base electrode to which said potential is applied.

7. A focus current control circuit as in claim 6; wherein said means for applying said potential to said base electrode of the second transistor includes operational amplifier means having a first input connected with said collector-emitter path of said second transistor, a second input connected with means providing an adjustably predetermined control voltage and an output connected to said base electrode of the second transistor.

8. A focus current control circuit for a multi-tube image pick-up apparatus having a plurality of electromagnetic focusing type image pick-up tubes including respective focusing coils connected in series with each other, comprising: main focus current control means connected in series with said series-connected focusing coils for controlling a main focus current so as to maintain a predetermined value thereof, said main focus current control means including a main current sensing resistor connected in series with said series-connected focusing coils so that a voltage across said main current sensing resistor indicates the value of said main focus current, adjustable means for providing an adjustably determined bias voltage, comparator means for comparing said bias voltage with said voltage across the main current sensing resistor and providing a corresponding output, and a current control device in series with said series-connected focusing coils for controlling the main current therethrough in accordance with said output of the comparator means; and a plurality of individual focus current control means respectively corresponding to said plurality of image pick-up tubes and each being connected in parallel with the respective one of said focusing coils for controlling an individual focus current flowing through said respective focusing coil.

9. A focus current control circuit as in claim 8; wherein each of said individual focus current control means includes a current control device and a current sensing resistor in series therewith for by-passing a portion of said main focus current away from the respective one of the focusing coils, and comparator means for sensing an amount of said by-passed current and providing a corresponding output which is fed back to the respective current control device for stabilizing said by-passed current.

10. A focus current control circuit as in claim 9; wherein each said individual focus current control means includes means for applying a respective bias potential to the respective comparator means and thereby determining the stabilized amount of current by-passed away from the respective focusing coil.

11. A focus current control circuit as in claim 10; wherein at least one of said individual focus current control means includes means for varying the respective bias potential relative to the bias potential applied to the comparator means in another of said individual focus current control means.

* * * * *